(12) United States Patent
Dunn et al.

(10) Patent No.: US 11,837,235 B2
(45) Date of Patent: Dec. 5, 2023

(54) COMMUNICATION TRANSFER BETWEEN DEVICES

(71) Applicant: Sorenson IP Holdings, LLC, Salt Lake City, UT (US)

(72) Inventors: Jason Dunn, Cottonwood Heights, UT (US); Travis Smith, Bountiful, UT (US); David Thomson, Bountiful, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 18/152,682

(22) Filed: Jan. 10, 2023

(65) Prior Publication Data

US 2023/0162738 A1 May 25, 2023

Related U.S. Application Data

(63) Continuation of application No. 16/552,939, filed on Aug. 27, 2019, now Pat. No. 11,557,296.

(51) Int. Cl.
| | |
|---|---|
| *G10L 15/26* | (2006.01) |
| *H04W 4/80* | (2018.01) |
| *H04W 76/10* | (2018.01) |
| *G10L 15/22* | (2006.01) |
| *G10L 15/30* | (2013.01) |
| *H04M 3/42* | (2006.01) |
| *H04M 1/72478* | (2021.01) |
| *H04M 7/00* | (2006.01) |

(Continued)

(52) U.S. Cl.
CPC .............. *G10L 15/26* (2013.01); *G10L 15/22* (2013.01); *G10L 15/30* (2013.01); *H04M 1/72478* (2021.01); *H04M 3/42391* (2013.01); *H04W 4/80* (2018.02); *H04W 76/10* (2018.02); *H04M 7/006* (2013.01); *H04N 5/278* (2013.01); *H04N 21/4884* (2013.01)

(58) Field of Classification Search
None
See application file for complete search history.

(56) References Cited

U.S. PATENT DOCUMENTS

| | | |
|---|---|---|
| 2007/0287438 A1 | 12/2007 | Hansen et al. |
| 2009/0111471 A1* | 4/2009 | Li .......................... H04W 36/14 455/437 |

(Continued)

*Primary Examiner* — Antim G Shah
(74) *Attorney, Agent, or Firm* — Maschoff Brennan

(57) ABSTRACT

A method may include obtaining an indicator that a first device is in a location of a second device and in response to obtaining the indicator, sending a redirect request to a communication service provider of the first device to direct, to the second device, incoming communication requests handled by the communication service provider that are directed to the first device. The method may further include after sending the redirect request and after a communication request to a communication session is directed to the first device, obtaining, at the second device, a communication indication to participate in the communication session. The method may further include directing audio of the communication session to a transcription system and obtaining, at the second device, the transcription of the audio from the transcription system. The method may also include presenting, by the second device, the audio and the transcription.

15 Claims, 6 Drawing Sheets

(51) Int. Cl.
    *H04N 5/278* (2006.01)
    *H04N 21/488* (2011.01)

(56) References Cited

U.S. PATENT DOCUMENTS

| | | |
|---|---|---|
| 2013/0115932 A1 | 5/2013 | Williams et al. |
| 2016/0088150 A1* | 3/2016 | Lam .................... H04L 65/1096 370/259 |
| 2017/0178630 A1* | 6/2017 | Gummadi .............. H04M 11/10 |
| 2018/0103136 A1* | 4/2018 | Holm .................. H04M 7/0036 |
| 2018/0199006 A1 | 7/2018 | Brooksby et al. |
| 2020/0382647 A1 | 12/2020 | Krochmal et al. |

* cited by examiner

COMMUNICATION TRANSFER BETWEEN DEVICES

CROSS-REFERENCE TO RELATED APPLICATION

This application is a continuation of U.S. patent application Ser. No. 16/552,939, filed on Aug. 27, 2019, the disclosure of which is incorporated herein by reference in its entirety.

FIELD

The embodiments discussed herein are related to transfer of communication between devices.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to transcribe communications may include obtaining an indicator that a first device is in a location where a second device is located. The method may also include in response to obtaining the indicator, sending a redirect request to a communication service provider of the first device to direct, to the second device, incoming communication requests handled by the communication service provider that are directed to the first device. The method may further include after sending the redirect request and after a communication request to a communication session is directed to the first device by a remote device, obtaining, at the second device, a communication indication to participate in the communication session. The method may further include directing audio of the communication session with the remote device to a transcription system configured to generate a transcription of the audio and obtaining, at the second device, the transcription of the audio from the transcription system. The method may also include presenting, by the second device, the audio and the transcription.

BRIEF DESCRIPTION OF THE DRAWINGS

Example embodiments will be described and explained with additional specificity and detail through the use of the accompanying drawings in which.

DESCRIPTION OF EMBODIMENTS

A hard-of-hearing person may have both a mobile phone and a transcription communication console. The transcription communication console may be designed to present audio of a communication session and a transcription of the audio of the communication session. The mobile phone may be useful for the hard-of-hearing person when the hard-of-hearing person is not at home to allow the hard-of-hearing person to receive text and audio communications. When the hard-of-hearing person is near the transcription communication console, the hard-of-hearing person may prefer to use the transcription communication console instead of the mobile device for a communication session for potentially improved understanding of the communication session.

Some embodiments in this disclosure relate to systems and methods that may be configured to transfer communication between devices. For example, a communication between a remote device and a mobile device may be transferred to a transcription communication console. In some embodiments, a mobile device may receive an indication that the mobile device is in a location at which the transcription communication console is located. In response to the indication, the mobile device may automatically direct that incoming audio communications, such as phone calls, be redirected to the transcription communication console. The mobile device may perform the redirect without intervention by the hard-of-hearing person. The transcription communication console may thus receive the incoming audio communications and establish an audio communication session. During the communication session, the transcription communication console may obtain transcriptions of audio of the communication session from a transcription system. The audio and the transcriptions may be presented by the transcription communication console during the communication session. In this manner, the hard-of-hearing person may use the transcription communication console instead of the mobile device for a communication session even when the request to the communication session is directed to the mobile device and not the transcription communication console.

The systems and methods described in this disclosure may thus provide a new and improved method to transfer communications between devices. Furthermore, the systems and methods described in this disclosure may improve technology with respect to audio communications and transfer of communications between devices.

Figure 1:
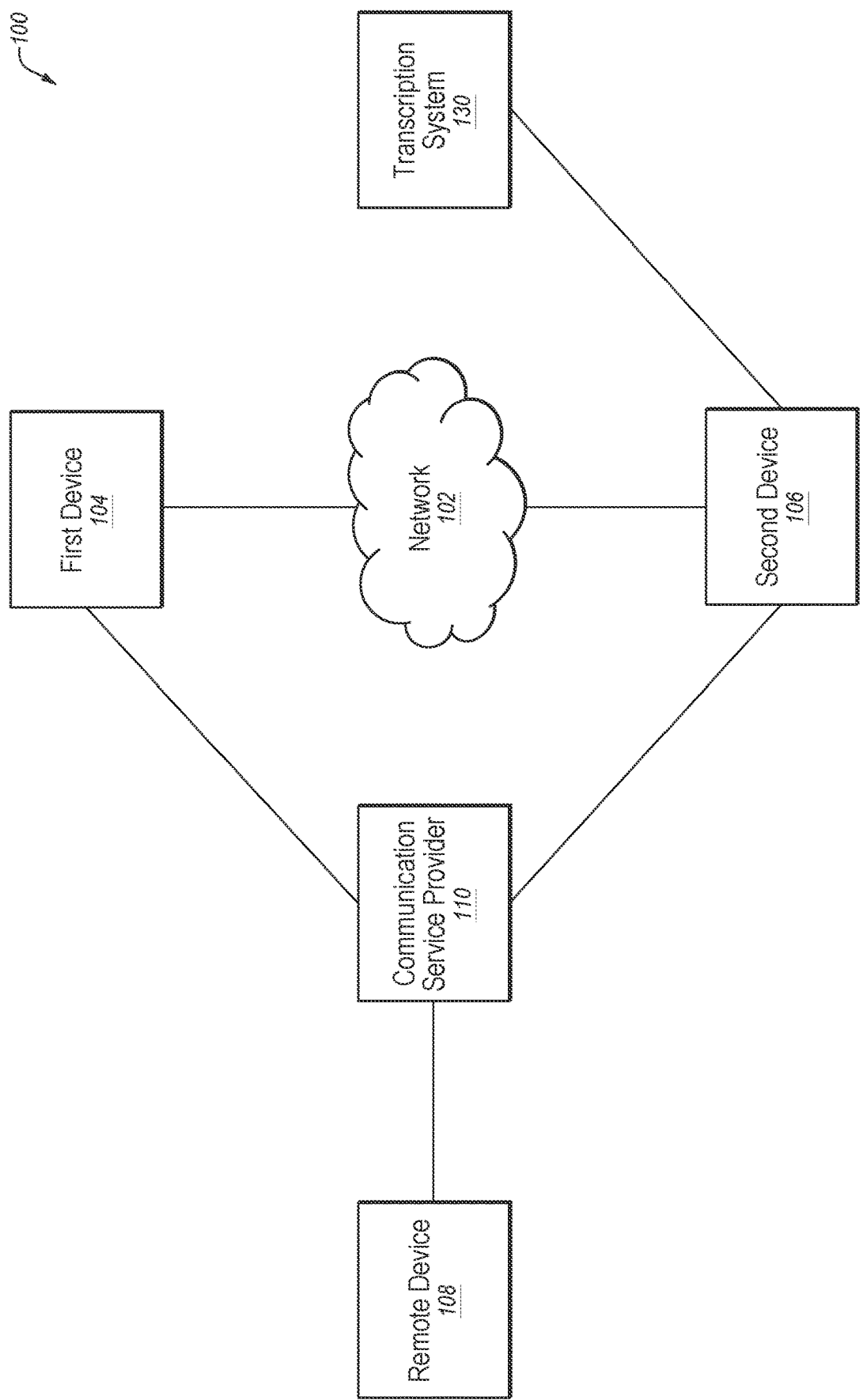
FIG. 1 illustrates an example environment for transfer of communication between devices.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, a remote device 108, a communication service provider 110, and a transcription system 130.

The network 102 may be configured to communicatively couple the first device 104 and the second device 106. In some embodiments, the network 102 may be any short-range wireless network, such as a wireless local area network (WLAN), a personal area network (PAN), or a wireless mesh network (WMN). For example, the network 102 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS. Communications may be performed over the network 102 using first communication protocols that may correspond to the associated short-range wireless networks that may be included in the network 102.

In some embodiments, the remote device 108, the communication service provider 110, the first device 104, and the second device 106 may be communicatively coupled. Alternatively or additionally, the second device 106 and the transcription system 130 may be communicatively coupled. In some embodiments, the remote device 108, the communication service provider 110, the first device 104, and the second device 106 may be communicatively coupled by a network. In these and other embodiments, the second device 106 and the transcription system 130 may be communicatively coupled by the network or a different network. The network or another network that communicatively couples devices and/or systems described in the present disclosure may have numerous different configurations.

For example, the network may be coupled to or may include portions of a telecommunications network for sending data in a variety of different communication protocols. In some embodiments, the network may include an Internet Protocol (IP) based network such as the Internet or an optical communications network such as wireless infrared or optical fiber. In some embodiments, the network may include cellular communication networks for sending and receiving communications and/or data including via hypertext transfer protocol (HTTP), direct data connection, wireless application protocol (WAP), etc. The network may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. In these or other embodiments, the network may include any combination of analog, digital, and/or optical networks that form a public switched telephone network (PSTN) that may transport audio of a communication session.

Each of the first device 104, the second device 106, and the remote device 108 may be any electronic or digital computing device. For example, each of the first and second devices 104 and 106 may include a desktop computer, a laptop computer, a smartphone, a mobile phone, a tablet computer, a telephone, an analog telephone adapter (ATA), a phone console, a caption device, a captioning telephone, a TV or other entertainment system, a display in a car dashboard, a wearable display such as a helmet or video-enabled glasses, a home appliance with a screen, other devices with a display, or any other computing device that may be used for communication between users of the first device 104, the second device 106, and the remote device 108. In some embodiments, the first device 104 may be a mobile device, such as a mobile phone, tablet computer, or other mobile device. In these and other embodiments, the second device 106 may be a stationary device. In these and other embodiments, a stationary device may be a device that is not configured to be carried or routinely moved by a user of the device. A stationary device does not assume that the device is not movable by a user. Rather, a stationary device indicates that the device is configured to generally be used in a single location. For example, the stationary device may be a desktop phone console, a desktop computer or other stationary device that may be used for communication.

In some embodiments, each of the first device 104, the second device 106, and the remote device 108 may include memory and at least one processor, which are configured to perform operations as described in this disclosure, among other operations. In some embodiments, each of the first device 104, the second device 106, and the remote device 108 may include computer-readable instructions that are configured to be executed by each of the first device 104, the second device 106, and the remote device 108, respectively, to perform operations described in this disclosure.

In some embodiments, each of the first device 104, the second device 106, and the remote device 108 may be configured to establish communication sessions with other devices. For example, each of the first device 104, the second device 106, and the remote device 108 may be configured to establish an outgoing communication session, such as a telephone call, video call, or other communication session, with another device over a telephone line or network. For example, each of the first device 104, the second device 106, and the remote device 108 may communicate over a wireless cellular network, a wired Ethernet network, an optical network, or a POTS line.

In some embodiments, each of the first device 104, the second device 106, and the remote device 108 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user. For example, the first device 104 may obtain the first audio from a microphone of the first device 104 or from another device that is communicatively coupled to the first device 104. The first device 104 may be configured to provide the audio of a communication session to the transcription system 130.

The transcription system 130 may include any configuration of hardware, such as processors, servers, and storage servers that are networked together and configured to perform a task. For example, the transcription system 130 may include one or multiple computing systems, such as multiple servers that each include memory and at least one processor. The transcription system 130 may be configured to generate transcriptions from audio. In some embodiments, the transcription system 130 may be an automatic system that automatically recognizes speech independent of human interaction to generate the transcription. In these and other embodiments, the transcription system 130 may include speech engines that are trained to recognize speech. The speech engine may be trained for general speech and not specifically trained using speech patterns of the participants in the communication session. Alternatively or additionally, the speech engine may be specifically trained using speech patterns of one or both of the participants of the communication session. Alternatively or additionally, the transcription system 130 may be a re-voicing system.

In some embodiments, the transcription system 130 may be configured to obtain audio from either the first device 104 and/or the second device 106. In these and other embodiments, the transcription system 130 may generate a transcription of the audio. The transcription system 130 may also provide the transcription of the audio devices, such as to the first device 104 and/or the second device 106. Either one or both of the first device 104 and the second device 106 may be configured to present the transcription received from the transcription system 130. For example, the first device 104 may be configured to display the received transcriptions on a display that is part of the first device 104 or that is communicatively coupled to the first device 104.

The communication service provider 110 may include any configuration of hardware that is networked together and configured to perform a task. The communication service provider 110 may be configured to obtain communication requests from devices and direct the communication requests to an appropriate device to allow for the establishment of a communication session between devices. As an example, the communication service provider 110 may be a mobile network provider, a plain old telephone service provider, a Voice-Over-Internet Protocol (VOIP) service provider, a digital telephone service provider, among any other type of audio communication service provider that is configured to maintain a system that provides for devices to make and receive audio communications, such as phone calls.

In some embodiments, the communication service provider 110 may be configured to redirect audio communication requests. For example, an audio communication request directed to the first device 104 may be redirected to the second device 106. In these and other embodiments, the first device 104 may or may not be aware of an audio communication request that is redirected to the second device 106. For example, the first device 104 may not receive a notification of an audio communication request that is redirected to the second device 106. Alternately or additionally, the first device 104 and the second device 106 may both obtain an indication of an audio communication request directed to the first device 104 when the communication service provider 110 is redirecting the audio communication request. In these and other embodiments, the first one of the first device 104 and the second device 106 that responds to the audio communication request may be joined into a communication session with the remote device 108 that initiated the audio communication request.

In some embodiments, the communication service provider 110 may obtain a redirect request from the first device 104. The redirect request may indicate that incoming communication requests directed to the first device 104 may be redirected to the second device 106. In some embodiments, the first device 104 may send the redirect request in response to obtaining an indication that the first device 104 is at a location of the second device 106. In these and other embodiments, the first device 104 may obtain the indication based on detection of the network 102.

For example, the first device 104 may be configured to detect the network 102. In response to detection of the network 102, the first device 104 may compare the network 102 to one or more previously identified network identifiers. In response to determining that the network 102 matches one or more of the previously identified network identifiers, the first device 104 may obtain a communication address, such as a phone number, of the second device 106 associated with the matching network identifier. In some embodiments, the first device 104 may obtain the communication address from the second device 106. In these and other embodiments, the second device 106 may obtain the communication address from a system, such as the transcription system. For example, the second device 106 may establish a communication session with the system such that the system obtains the communication address of the second device 106. The system may send the second device 106 the communication address of the second device 106. Alternately or additionally, the first device 104 may obtain the communication address from memory or from another device and/or system.

As another example, the first device 104 may be configured to detect and connect to the network 102. After connecting to the network 102, the first device 104 may detect and communicate with the second device 106. Based on the communication with the second device 106, the first device 104 may obtain an indication that the first device 104 is at the location of the second device 106. In these and other embodiments, the first device 104 may obtain the communication address of the second device 106 from the second device 106, from memory of the first device 104, or from another device and/or system.

In some embodiments, the first device 104 may provide the communication address of the second device 106 to the communication service provider 110. The first device 104 may also request that the communication service provider 110 redirect, to the second device 106, the request to communication sessions directed to the first device 104.

In some embodiments, the communication service provider 110 may obtain a revocation of the redirect request from the first device 104. In these and other embodiments, in response to the revocation of the redirect request, the communication service provider 110 may direct future incoming communication requests to the first device 104 and not direct the requests to the second device 106. In these and other embodiments, the first device 104 may send the request of revocation in response to obtaining an indication that the first device 104 is no longer at the location of the second device 106. In some embodiments, the first device 104 may obtain the indication based on not being able to detect the network 102.

In some embodiments, the communication service provider 110 may be configured to add additional devices to a communication session or adjust the devices participating in a communication session. For example, during a communication session between the remote device 108 and the first device 104 and at the request of the first device 104, the communication service provider 110 may send a request to the second device 106 that the second device 106 join the communication session. In these and other embodiments, the first device 104 may be maintained in the communication session. Alternately or additionally, the first device 104 may be released from the communication session and the communication session may be maintained between the remote device 108 and the second device 106.

In some embodiments, the communication service provider 110 may send the request to the second device 106 to join a communication session in response to a request from the first device 104. In these and other embodiments, the first device 104 may send the request to the communication service provider 110 for the second device 106 to join the communication session in response to the first device 104 being at the location of the second device 106.

In some embodiments, during a communication session between the remote device 108 and the first device 104 before the second device 106 joins the communication session, the first device 104 may obtain transcriptions of the audio of the communication session from the transcription system 130. In these and other embodiments, in response to the second device 106 joining the communication session, the first device 104 may direct the transcriptions of the communication session to the second device 106. In these and other embodiments, the second device 106 may be configured to provide second audio of the communication that occurs after the second device 106 joins the communication session to the transcription system 130. The second device 106 may obtain transcription of the second audio from the transcription system 130. As a result, the second device 106 may obtain a transcription of the entire communication session including the portion of the communication session that occurred before the second device 106 joined the communication session. The second device 106 may be configured to present the transcription of the entire communication session. In some embodiments, the second device 106 may be configured to present the transcription of the second audio of the communication in substantially real-time with the representation of the second audio. In substantially real-time may indicate that a lag between the presentation of the second audio and the transcription of the second audio may be less than one, two, three, five, or ten seconds.

Modifications, additions, or omissions may be made to the environment 100 and/or the components operating in the environment 100 without departing from the scope of the present disclosure. For example, in some embodiments, the environment 100 may not include the second device 106. In these and other embodiments, the first device 104 may be associated with a first communication address and a second communication address. Examples of the first communication address and the second communication address may include a POTS line number, a VoIP number, an IP address, an IMEI code, a MAC address, a device login credentials, a physical location, an email address, an account number, a user login ID or handle, session identifiers, or other device or software application identifiers. For example, the first communication address may be a first phone number assigned by the communication service provider 110. As an example, the first phone number may be a mobile phone number associated with the first device 104 based on a subscriber identification module (SIM) card coupled to the first device 104. The second communication address may be a second phone number from a VOIP service. The second phone number may be associated with the first device 104 based on the execution of an application on the first device 104 that associates the first device 104 with the second phone number.

In these and other embodiments, the first device 104 may request that the communication service provider 110 redirect audio communication requests directed to the first communication address of the first device 104 to the second communication address of the first device 104. The first device 104 may request the communication service provider 110 to redirect audio communication requests based on an indication obtained at the first device 104. For example, an indication may include input from a user of the first device 104 to redirect audio communication requests. Alternately or additionally, an indication may include the first device 104 being located at a particular location, being able to detect and connect to a data network, such as the network 102 or another type of data network, or in response to another event, such as a calendar event or usage of the first device 104 meeting a particular criteria.

An example of redirecting communication requests from a first communication address to a second communication address follows. In some embodiments, audio of a communication session through a first communication address, for example a mobile phone number, may not be directed to the transcription system 130. As a result, no transcription may be obtained by the first device 104 of audio of a communication session by way of the mobile phone number. In these and other embodiments, the first device 104 may request that the communication service provider 110 redirect audio to the second communication address of the first device 104. The second communication address may be a VOIP number associated with the first device 104. Audio of a communication through the VOIP number may be directed to the transcription system 130. As a result, a transcription of audio of a communication session by way of the VOIP number may be obtained. When a communication request is directed to the mobile phone number through the communication service provider 110, the communication service provider 110 may redirect the communication request to the VOIP number. Thus, the first device 104 may obtain transcriptions of audio of a communication session that the first device 104 may not have otherwise been able to obtain.

Figure 2:
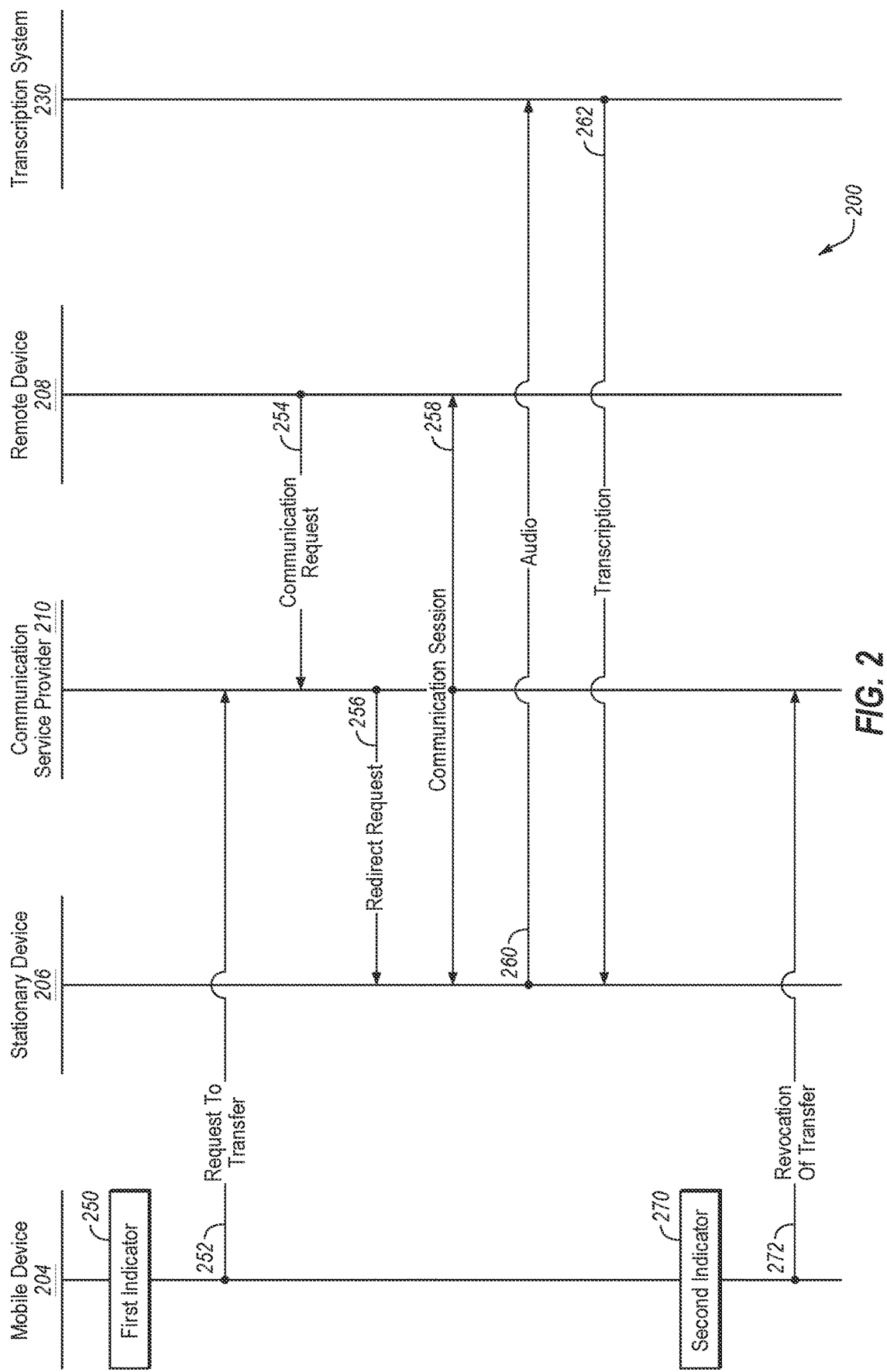
FIG. 2 illustrates example operations related to transfer of communication between devices.

FIG. 2 illustrates example operations 200 related to transfer of communication between devices. The operations 200 may be arranged in accordance with at least one embodiment described in the present disclosure. In the illustrated example, the operations 200 may be between a mobile device 204, a stationary device 206, a remote device 208, a communication service provider 210, and a transcription system 230. In some embodiments, the mobile device 204, the stationary device 206, the remote device 208, the communication service provider 210, and the transcription system 230 may be analogous to the first device 104, the second device 106, the remote device 108, the communication service provider 110, and the transcription system 130, respectively, of FIG. 1. Accordingly, no further explanation is provided with respect thereto. Alternatively or additionally, the operations 200 may be an example of the operation of the elements of the environment 100 of FIG. 1.

In some embodiments, the operations 200 may be an example of communications and interactions between the mobile device 204, the stationary device 206, the remote device 208, the communication service provider 210, and the transcription system 230. In some embodiments, the interactions between the mobile device 204, the stationary device 206, the remote device 208, the communication service provider 210, and the transcription system 230 may occur over one or more networks. Generally, the operations 200 may relate to transfer of communication between the mobile device 204 and the stationary device 206. The operations 200 illustrated are not exhaustive but are merely representative of operations 200 that may occur. Furthermore, one operation as illustrated may represent one or more communications, operations, and/or data exchanges.

At operation 250, a first indicator may be obtained by the mobile device 204. In some embodiments, the first indicator may be obtained based on the mobile device 204 being within range of a short-range wireless network. For example, the mobile device 204 may include a record of a short-range wireless network that the stationary device 206 may also detect. In these and other embodiments, the mobile device 204 detecting the short-range wireless network may be the first indicator.

In some embodiments, the first indicator may be obtained by the mobile device 204 from the stationary device 206. For example, the stationary device 206 may communicate with the mobile device 204. In these and other embodiments, the communication may be the first indicator. In some embodiments, the first indicator may be the mobile device 204 obtaining a location of the mobile device 204. For example, the location may be obtained from a global positioning system, from a wireless network, from a user, from a customer record, or from some other source. In these and other embodiments, the location obtained may be the same as a location of the stationary device 206. In these and other embodiments, the location may be the same as the location of the stationary device 206 when the distances between the mobile device 204 and the stationary device 206 are within a particular threshold. The particular threshold may be a distance comparable to a size of an ordinary dwelling, room within a dwelling, or some other distance.

In some embodiments, the first indicator may be based on a determination that the user of a mobile device 204 is determined, such as via image analysis, to be in visual range and/or looking at the stationary device 206. Alternately or additionally, the first indicator may be based on an ultrasonic, electrostatic, heat-sensing, or optical proximity detector that indicates that the mobile device 204 is within a particular distance of the stationary device 206.

In some embodiments, the first indicator may be based on the stationary device 206 or other device detecting a voice of the user of the mobile device 204, as captured by a microphone of the stationary device 206 or the other device. In these and other embodiments, the detection of the voice may be sensitive to loudness (to estimate distance) or a comparison between the voice of the user and a stored voiceprint. Alternately or additionally, the first indicator may be based on the stationary device 206, the mobile device 204, or some other device obtaining input from the user. The input may include the user pressing a key, touching a touch screen, or moving the stationary device 206, the mobile device 204, or some other device as determined by an accelerometer.

At operation 252, in response to the first indicator, the mobile device 204 may send to the communication service provider 210 a request to redirect audio communication requests. The request to redirect audio communication requests may include redirecting, to the stationary device 206, audio communication requests that are directed to the mobile device 204. For example, a first communication request from the remote device 208 may be directed to the mobile device 204. In this example, the first communication request may be made by the remote device 208 by dialing a phone number associated with the mobile device 204. The request may be obtained by the communication service provider 210. Based on the redirect request, the communication service provider 210 may redirect the first communication request to the stationary device 206 instead of the mobile device 204.

In some embodiments, the mobile device 204 may send the request to redirect automatically without input from a user of the mobile device 204. For example, the mobile device 204 may include instructions that cause the mobile device 204, in response to obtaining the first indicator, to send the request to redirect. In some embodiments, the request to redirect may be sent by the mobile device 204 by the mobile device 204 dialing a sequence of numbers that indicates to the communication service provider 210 to redirect audio communication requests. In some embodiments, the request to redirect may be sent in response to a change in a configuration in the mobile device 204. For example, a configuration regarding redirecting audio communication requests may be performed on the mobile device 204. In response to the change in the configuration, the mobile device 204 may send an indication of the change to the communication service provider 210. Alternately or additionally, the request to redirect may be sent over an Internet Protocol network to the communication service provider 210. For example, the request to redirect may be sent over the Internet based on the mobile device 204 accessing a webpage or application programming interface (API) associated with the communication service provider 210. Alternately or additionally, the request to redirect may be sent to the communication service provider 210 by the mobile device 204 communicating with the communication service provider 210 using any other communication protocol.

At operation 254, an audio communication request may be sent by the remote device 208 to the mobile device 204. Based on the communication service provider 210 providing communication services to the mobile device 204, the request may be obtained by the communication service provider 210. The request being obtained by the communication service provider 210 may indicate that one or more pieces of hardware or forwarding instructions maintained or provided by the communication service provider 210 may be used to direct audio communication requests to the mobile device 204. In these and other embodiments, the communication service provider 210 may include hardware or instructions that indicate that an audio communication request directed to the mobile device 204 may be redirected to the stationary device 206.

At operation 256, the audio communication request may be redirected to the stationary device 206 instead of being directed to the mobile device 204. In some embodiments, the communication service provider 210 may provide an indication of the redirection of the request to the remote device 208. Alternately or additionally, the remote device 208 may not be aware that the request is redirected to the stationary device 206 by the communication service provider 210.

In some embodiments, when redirecting the audio communication request the communication service provider 210 may also provide an indication of the audio communication request to the mobile device 204.

At operation 258, a communication session may be established between the stationary device 206 and the remote device 208. During the communication session, audio obtained by the remote device 208 may be directed to the stationary device 206. For example, audio that includes speech of a user of the remote device 208 may be provided to the stationary device 206.

At operation 260, the stationary device 206 may provide the audio of the communication session to the transcription system 230. The transcription system 230 may obtain a transcription of the audio.

At operation 262, the transcription system 230 may provide the transcription of the audio of the communication session to the stationary device 206. The stationary device 206 may present the transcription of the audio. The presentation of the transcription of the audio may occur substantially aligned with the presentation of the audio of the communication session by the stationary device 206.

At operation 270, the mobile device 204 may obtain a second indicator. The second indicator may indicate that the mobile device 204 is not at a location of the stationary device 206. For example, the mobile device 204 may be at a second location that is different than a first location of the stationary device 206.

In some embodiments, the second indicator may be obtained based on the mobile device 204 not being within range of the short-range wireless network. For example, the mobile device 204 may leave the location of the short-range wireless network.

At operation 272, in response to the second indicator, the mobile device 204 may send a revocation of the redirect request to the communication service provider 210. The mobile device 204 may use the same method or a different method to send the revocation request as the mobile device 204 used to send the redirect request. In response to the revocation of the redirect request, the communication service provider 210 may not redirect to the stationary device 206 audio communication requests directed to the mobile device 204. Rather, the communication service provider 210 may provide the audio communication requests directed to the mobile device 204 to the mobile device 204 and not the stationary device 206.

Modifications, additions, or omissions may be made to the operations 200 without departing from the scope of the present disclosure. For example, the operations 200 may not include the operations 270 and 272 in some embodiments. In some embodiments, one or more operations associated with the operation 260 may be omitted or performed by a device different than the devices and/or systems indicated in FIG. 2. As another example, in some embodiments, the operations 200 may be arranged in a different order or performed at the same time. Further, the operations 260 and 262 may be performed in an ongoing basis during the communication session. Further, the audio may be sent from the remote device 208 directly to transcription system 230 without passing through the stationary device 206. For example, the audio may be sent from the remote device 208 through the communication service provider 210 to the transcription system 230.

In some embodiments, the transcription and the audio may be sent to different devices. For example, the communication service provider 210 may send the audio from the remote device 208 to the stationary device 206. In these and other embodiments, the transcription system 230 may send the transcriptions to the mobile device 204. Additionally or alternatively, the audio and/or the transcriptions may be sent to multiple devices, including devices other than devices 204, 206, and 208, such as devices on a multi-party conference call.

Figure 3:
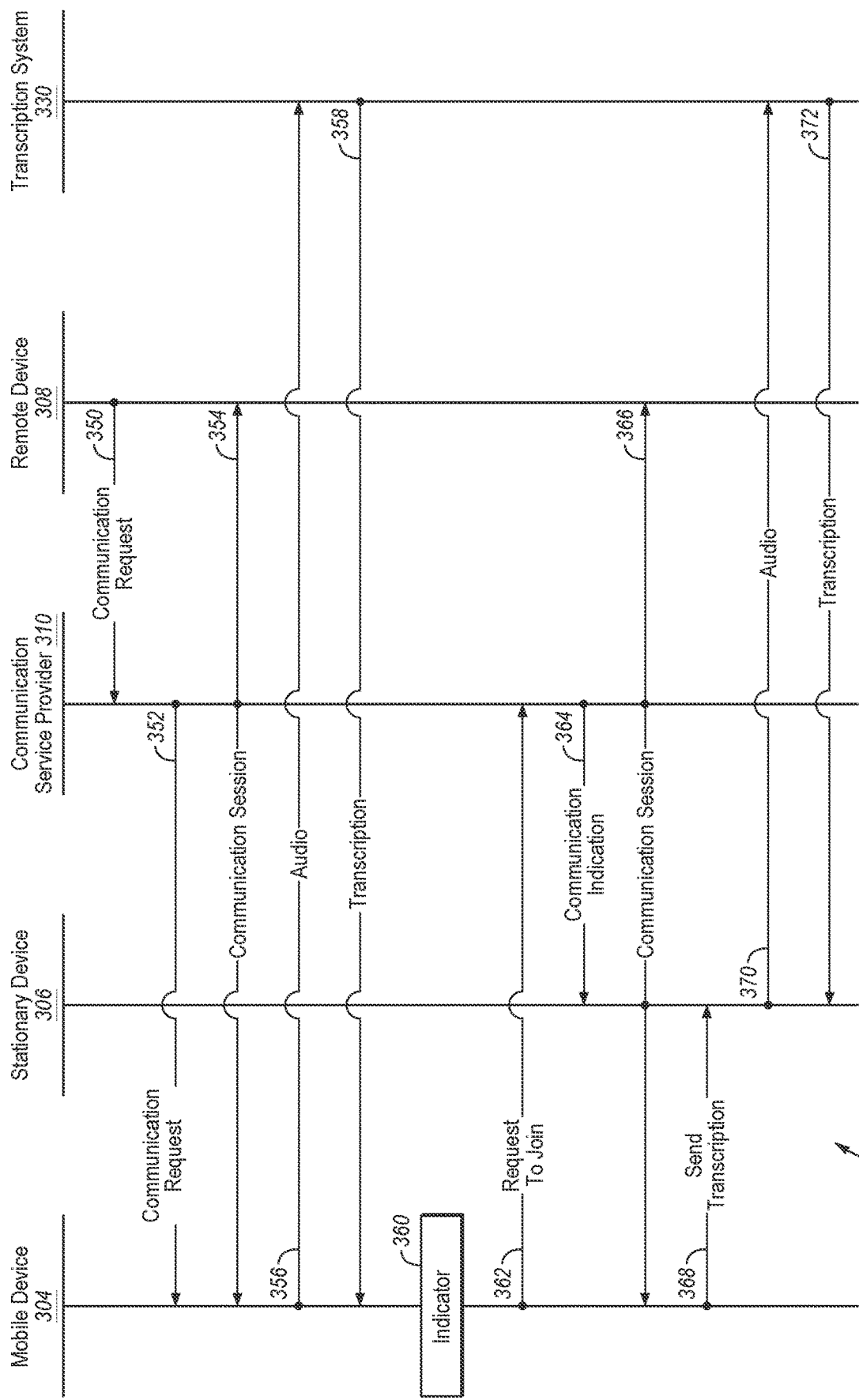
FIG. 3 illustrates example operations related to transfer of communication between devices.

FIG. 3 illustrates example operations 300 related to transfer of communication between devices. The operations 300 may be arranged in accordance with at least one embodiment described in the present disclosure. In the illustrated example, the operations 300 may be between a mobile device 304, a stationary device 306, a remote device 308, a communication service provider 310, and a transcription system 330. In some embodiments, the mobile device 304, the stationary device 306, the remote device 308, the communication service provider 310, and the transcription system 330 may be analogous to the first device 104, the second device 106, the remote device 108, the communication service provider 110, and the transcription system 130, respectively, of FIG. 1. Accordingly, no further explanation is provided with respect thereto. Alternatively or additionally, the operations 300 may be an example of the operation of the elements of the environment 100 of FIG. 1.

In some embodiments, the operations 300 may be an example of communications and interactions between the mobile device 304, the stationary device 306, the remote device 308, the communication service provider 310, and the transcription system 330. In some embodiments, the interactions between the mobile device 304, the stationary device 306, the remote device 308, the communication service provider 310, and the transcription system 330 may occur over one or more networks. Generally, the operations 300 may relate to the stationary device 306 joining a communication session. The operations 300 illustrated are not exhaustive but are merely representative of operations 300 that may occur. Furthermore, one operation as illustrated may represent one or more communications, operations, and/or data exchanges.

At operation 350, an audio communication request may be sent by the remote device 308 to the mobile device 304. Based on the communication service provider 310 providing communication services to the mobile device 304, the request may be obtained by the communication service provider 310.

At operation 352, the audio communication request may be directed to the mobile device 304 by the communication service provider 310.

At operation 354, in response to the request, the mobile device 304 may indicate to establish a communication session and the communication session may be established between the mobile device 304 and the remote device 308. During the communication session, audio obtained by the mobile device 304 may be directed to the remote device 308. For example, audio that includes speech of a user of the remote device 308 may be provided to the mobile device 304.

At operation 356, the mobile device 304 may provide the audio of the communication session to the transcription system 330. The transcription system 330 may obtain a transcription of the audio.

At operation 358, the transcription system 330 may provide the transcription of the audio of the communication session to the mobile device 304. The mobile device 304 may present the transcription of the audio. The presentation of the transcription of the audio may occur substantially aligned with the presentation of the audio of the communication session by the mobile device 304.

At operation 360, the mobile device 304 may obtain an indicator. In some embodiments, the indicator may be obtained based on the mobile device 304 being within range of a short-range wireless network. For example, the mobile device 304 may include a record of a short-range wireless network that the stationary device 306 may also detect. In these and other embodiments, the mobile device 304 detecting the short-range wireless network may be the indicator.

In some embodiments, the indicator may be obtained by the mobile device 304 from the stationary device 306. For example, the stationary device 306 may communicate with the mobile device 304. In these and other embodiments, the communication may be the indicator. In some embodiments, the indicator may be the mobile device 304 obtaining a location of the mobile device 304. For example, the location may be obtained from a global positioning system, from a wireless network, from a user, or from some other source. In these and other embodiments, the location obtained may be the same as a location of the stationary device 306.

At operation 362, a request to the stationary device 306 to be joined to the communication session may be provided to the communication service provider 310 from the mobile device 304. The request may be to have the stationary device 306 join the communication session between the mobile device 304 and the remote device 308. The mobile device 304 may send the request to the stationary device 306 to be joined to the communication session in response to the indicator being obtained by the mobile device 304. As an example, the mobile device 304 may be in the communication session with the remote device 308 as the mobile device 304 is moving. As the mobile device 304 comes to a location of the stationary device 306, such as in a home of a user of the mobile device 304 that includes the stationary device 306, the mobile device 304 may obtain the indicator. For example, the mobile device 304 may obtain a location of the mobile device 304. In response to the mobile device 304 being at the location of the stationary device 306, the mobile device 304 may send a request to have the stationary device 306 joined in the communication session.

At operation 364, the communication service provider 310 may send a communication indication to the stationary device 306. The communication indication may request that the stationary device 306 join the communication between the mobile device 304 and the remote device 308. For example, the request to join and the communication indication of operations 362 and 364 may be performed using a three-way telephonic communication protocol.

At operation 366, the stationary device 306 may be joined into the communication session between the mobile device 304 and the remote device 308. For example, the stationary device 306 may be joined into the communication session in response to the stationary device 306 providing a response to the communication service provider 310. In these and other embodiments, the stationary device 306 may provide the response to the communication service provider 310 in response to the communication indication from the communication service provider 310.

As a result of the stationary device 306 joining the communication session, the communication session may be between the mobile device 304, the stationary device 306, and the remote device 308. During the communication session, audio obtained by the remote device 308 may be directed to the stationary device 306 and the mobile device 304. Alternately or additionally, audio obtained by the stationary device 306 may be directed to the mobile device 304 and the remote device 308.

At operation 368, the mobile device 304 may send the transcription that the mobile device 304 obtained from the transcription system 330 to the stationary device 306. In these and other embodiments, the stationary device 306 may be configured to present the transcription from the mobile device 304. Thus, a user of the mobile device 304 may be able to view on the stationary device 306 the transcription of the communication session that occurred between the mobile device 304 and the remote device 308.

At operation 370, the stationary device 306 may provide the audio of the communication session to the transcription system 330. The transcription system 330 may obtain a transcription of the audio. In these and other embodiments, the transcription may include a transcription of audio obtained from the mobile device 304, the stationary device 306, and/or the remote device 308.

At operation 372, the transcription system 330 may provide the transcription of the audio of the communication session to the stationary device 306. The stationary device 306 may present the transcription of the audio. The presentation of the transcription of the audio may occur substantially aligned with the presentation of the audio of the communication session by the stationary device 306. In these and other embodiments, the stationary device 306 may combine the transcription obtained directly from the transcription system 330 with the transcription obtained from the mobile device 304. As such, the stationary device 306 may include a combined transcription of the entire communication session including a portion of the communication session in which the stationary device 306 is not part of the communication session.

Modifications, additions, or omissions may be made to the operations 300 without departing from the scope of the present disclosure. For example, the operations 300 may not include the operations 356, 358, and 368 in some embodiments. As another example, in some embodiments, the operations 300 may be arranged in a different order or performed at the same time. For example, the operation 368 may be performed at the same time or after the operations 370 and 372.

Further, the operations 370 and 372 may be performed in an ongoing basis during the communication session. In addition, one or more operations may be performed by different devices than as described. For example, the audio of the communication session after the stationary device 306 joins the communication session may be sent by the mobile device 304 to the transcription system 330 instead of by the stationary device 306. In these and other embodiments, the transcription system 330 may send the transcription to the stationary device 306 and/or the mobile device 304.

Alternatively or additionally, the operations 300 may include additional operations. For example, the operations 300 may include the stationary device 306 providing the transcriptions from the transcription system 330 to the mobile device 304 such that the mobile device 304 includes the transcription for the entire communication session.

Alternatively or additionally, one or more of the operations 300 may be performed differently. For example, after the stationary device 306 joins the communication session, the mobile device 304 may leave the communication session. In these and other embodiments, the communication session may be between the stationary device 306 and the remote device 308 without the participation of the mobile device 304.

Figure 4:
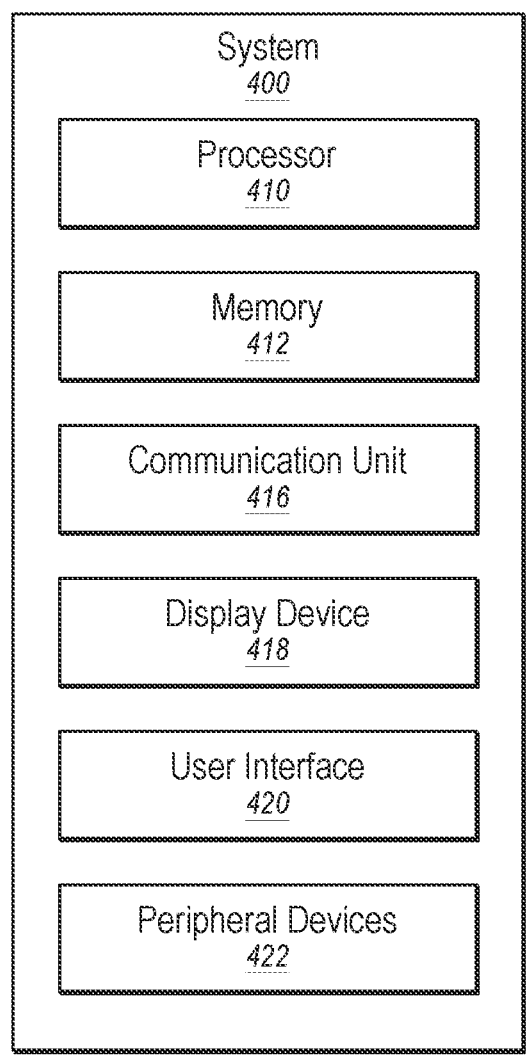
FIG. 4 illustrates an example system that may be used during transfer of communication between devices.

FIG. 4 illustrates an example system 400 that may be used during transfer of communication between devices as described in this disclosure. The system 400 may include a processor 410, memory 412, a communication unit 416, a display device 418, a user interface unit 420, and a peripheral device 422, which all may be communicatively coupled. In some embodiments, the system 400 may be part of any of the systems or devices described in this disclosure.

For example, the system 400 may be part of the first device 104 of FIG. 1 and may be configured to perform one or more of the tasks described above with respect to the first device 104. As another example, the system 400 may be part of the first device 104 or the second device 106 of FIG. 1 and may be configured to perform one or more of the tasks described above with respect to the first device 104 and/or the second device 106. As another example, the system 400 may be part of the transcription system 130 of FIG. 1 and may be configured to perform one or more of the tasks described above with respect to the transcription system 130.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), a graphics processing unit (GPU) or other form of parallel processor, or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to gain operations such that the system 400 may perform or direct the performance of the operations associated therewith as directed by the instructions. In these and other embodiments, the instructions may be used to perform one or more operations described above with respect to the transcription system 130 of FIG. 1, and/or one or more of the operations of the methods 500 and 600 of FIGS. 5 and 6, respectively.

The memory 412 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), a telephone jack, and/or the like. The communication unit 416 may permit data to be exchanged with a network and/or any other devices or systems described in the present disclosure.

The display device 418 may be configured as one or more displays that present images, words, etc., like an LCD, LED, projector, or other type of display. The display device 418 may be configured to present video, text captions, user interfaces, and other data as directed by the processor 410. For example, when the system 400 is included in the second device 106 of FIG. 1, the display device 418 may be configured to present transcriptions.

The user interface unit 420 may include any device to allow a user to interface with the system 400. For example, the user interface unit 420 may include a mouse, a track pad, a keyboard, buttons, and/or a touchscreen, among other devices. The user interface unit 420 may receive input from a user and provide the input to the processor 410. In some embodiments, the user interface unit 420 and the display device 418 may be combined.

The peripheral devices 422 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may present audio received by the system 400 or otherwise generated by the system 400 by broadcasting the audio.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

Figure 5:
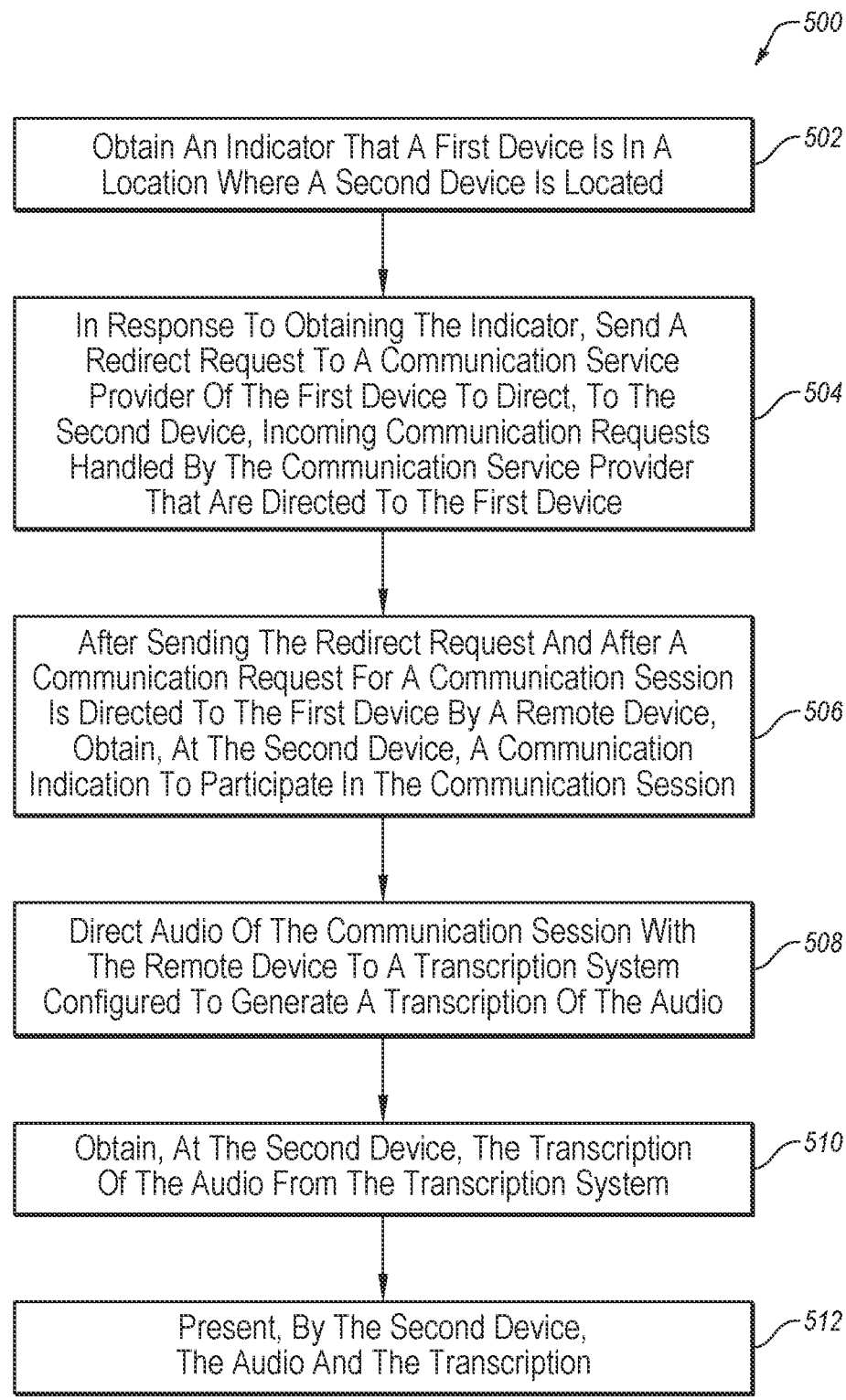
FIG. 5 is a flowchart of an example method to transfer communication between devices.

FIG. 5 is a flowchart of another example method 500 to transcribe communications. The method 500 may be arranged in accordance with at least one embodiment described in the present disclosure. The method 500 may be performed, in some embodiments, by a device or system, such as the first device 104 or the second device 106 of FIG. 1 or the computing system 400 of FIG. 4, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where an indicator that a first device is in a location where a second device is located may be obtained. In some embodiments, the first device may be a mobile device and the second device may be a stationary device.

At block 504, in response to obtaining the indicator, a redirect request may be sent to a communication service provider of the first device to direct, to the second device, incoming communication requests handled by the communication service provider that are directed to the first device.

At block 506, after sending the redirect request and after a communication request for a communication session is directed to the first device by a remote device, a communication indication to participate in the communication session may be obtained at the second device. In some embodiments, after obtaining the communication indication to participate, the second device may establish the communication session with the remote device without participation of the first device.

At block 508, audio of the communication session with the remote device may be directed to a transcription system configured to generate a transcription of the audio. At block 510, the transcription of the audio from the transcription system may be obtained at the second device. At block 512, the audio and the transcription may be presented by the second device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include obtaining a second indicator that the first device is not within range of a short-range wireless network to which the second device is connected. The method 500 may further include in response to the second indicator, sending a revoke redirect request to the communication service provider of the first device to stop directing incoming communication requests handled by the communication service provider to the second device.

In some embodiments, after obtaining the communication indication to participate, the second device may join the communication session that is established between the remote device and the first device. In these and other embodiments, the audio directed to the transcription system may include first audio originating at the first device and second audio originating at the remote device and the transcription of the audio includes transcription of the first audio and the second audio.

In these and other embodiments, the method 500 may further include in response to the second device joining the communication session between the remote device and the first device, the first device may direct, to the second device, a second transcription obtained from the transcription system of the communication session between the first device and remote device before the second device joins the communication session. In some embodiments, the method 500 may further include presenting, by the second device, the second transcription along with the first transcription.

Figure 6:
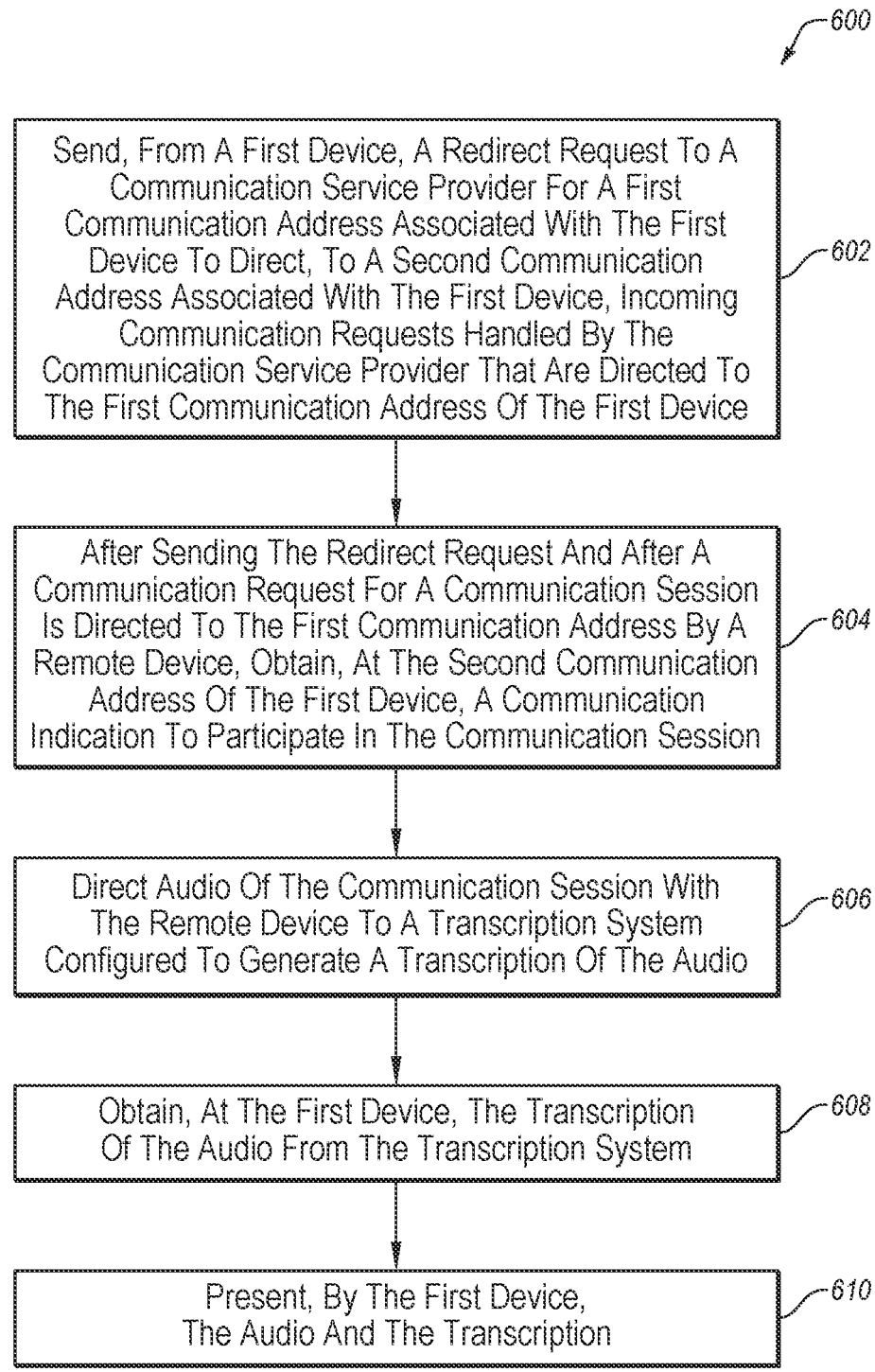
FIG. 6 is a flowchart of another example method to transfer communication between devices.

FIG. 6 is a flowchart of another example method 600 to transcribe communications. The method 600 may be arranged in accordance with at least one embodiment described in the present disclosure. The method 600 may be performed, in some embodiments, by a device or system, such as the first device 104 or the second device 106 of FIG. 1 or the computing system 400 of FIG. 4, or another device. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a redirect request may be sent from a first device to a communication service provider for a first communication address associated with the first device to direct, to a second communication address associated with the first device, incoming communication requests handled by the communication service provider that are directed to the first communication address of the first device.

In some embodiments, the first communication address may be associated with a wireless communication carrier and the second communication address is associated with a voice over internet protocol (VOIP) company.

At block 604, after sending the redirect request and after a communication request for a communication session is directed to the first communication address by a remote device, a communication indication to participate in the communication session may be obtained at the second communication address of the first device.

In some embodiments, after obtaining the communication indication to participate, the communication session is established with the remote device through the second communication address without including the first communication address.

At block 606, audio of the communication session with the remote device may be directed to a transcription system configured to generate a transcription of the audio. At block 608, the transcription of the audio from the transcription system may be obtained at the first device. At block 610, the audio and the transcription may be presented by the first device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, after obtaining the communication indication to participate, the second communication address may join the communication session that is established between the remote device and the first communication address. In these and other embodiments, the method 600 may further include obtaining the audio of the communication session with the remote device to direct to the transcription system from the second communication address after disconnection of the first communication address from the communication session.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 412 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method to transcribe communications, the method comprising:
    obtaining user input that results in a redirect request being sent to a communication service provider for a first device;
    in response to the user input, sending, from the first device, the redirect request to the communication service provider for a first communication address associated with the first device to direct, to a second communication address associated with the first device, incoming communication requests handled by the communication service provider that are directed to the first communication address of the first device;
    after sending the redirect request and after a communication request to a communication session is directed to the first communication address by a remote device, obtaining, at the second communication address of the first device, a communication indication to participate in the communication session;
    in response to obtaining audio of the communication session via the second communication address of the first device, directing the audio from the first device to a transcription system configured to generate a transcription of the audio, the transcription system not being part of the communication session;
    obtaining, at the first device, the transcription of the audio from the transcription system; and
    presenting, by the first device, the audio and the transcription.

2. The method of claim 1, wherein after obtaining the communication indication to participate, the second communication address joins the communication session that is established between the remote device and the first communication address.

3. The method of claim 2, further comprising obtaining the audio of the communication session with the remote device to direct to the transcription system from the second communication address after disconnection of the first communication address from the communication session.

4. The method of claim 1, wherein the first communication address is a phone number associated with a wireless communication carrier and the second communication address is a phone number associated with a voice over internet protocol (VOIP) company.

5. The method of claim 1, wherein after obtaining the communication indication to participate, the communication session is established with the remote device through the second communication address without including the first communication address.

6. At least one non-transitory computer-readable media configured to store one or more instructions that when executed by at least one processor cause or direct a system to perform the method of claim 1.

7. A device comprising:
a communication unit configured to:
in response to user input, send a redirect request to a communication service provider for a first communication address associated with the device to direct, to a second communication address associated with the device, incoming communication requests handled by the communication service provider that are directed to the first communication address of the device;
after sending the redirect request and after a communication request to a communication session is directed to the first communication address by a remote device, obtain, at the second communication address of the device, a communication indication to participate in the communication session;
in response to obtaining audio of the communication session via the second communication address of the device, direct the audio from the device to a transcription system configured to generate a transcription of the audio, the transcription system not being part of the communication session; and
obtain the transcription of the audio from the transcription system;
a peripheral device configured to broadcast the audio; and
a display configured to present the transcription.

8. The device of claim 7, wherein after obtaining the communication indication to participate, the second communication address joins the communication session that is established between the remote device and the first communication address.

9. The device of claim 8, wherein the communication unit is further configured to obtain the audio of the communication session with the remote device to direct to the transcription system from the second communication address after disconnection of the first communication address from the communication session.

10. The device of claim 7, wherein the first communication address is a phone number associated with a wireless communication carrier and the second communication address is a phone number associated with a voice over internet protocol (VOIP) company.

11. The device of claim 7, wherein after obtaining the communication indication to participate, the communication session is established with the remote device through the second communication address without including the first communication address.

12. A method to transcribe communications, the method comprising:
establishing a communication session between a first communication address associated with a first device and a remote device;
obtaining user input related to bridging the first communication address associated with the first device to a second communication address associated with the first device during the communication session;
in response to the user input, sending a request to a communication system to bridge the first communication address associated with the first device to the second communication address associated with the first device during the communication session, wherein after the first communication address is bridged with the second communication address the first communication address is disconnected from the communication session;
after disconnection of the first communication address from the communication session and in response to obtaining audio of the communication session via the second communication address of the first device, directing audio of the communication session obtained via the second communication address from the first device to a transcription system configured to generate a transcription of the audio, the transcription system not being part of the communication session;
obtaining, at the first device, the transcription of the audio from the transcription system;
and
presenting, by the first device, the audio and the transcription.

13. The method of claim 12, wherein the first communication address is a phone number associated with a wireless communication carrier and the second communication address is a phone number associated with a voice over internet protocol (VOIP) company.

14. The method of claim 12, wherein the communication system is a communication service provider for the first communication address.

15. At least one non-transitory computer-readable media configured to store one or more instructions that when executed by at least one processor cause or direct a system to perform the method of claim 12.

* * * * *